(12) United States Patent
Spiess et al.

(10) Patent No.: US 11,219,965 B2
(45) Date of Patent: Jan. 11, 2022

(54) METHOD AND PROCESSING MACHINE FOR PIERCING, DRILLING OR CUTTING METAL WORKPIECES

(71) Applicant: TRUMPF Werkzeugmaschinen GmbH + Co. KG, Ditzingen (DE)

(72) Inventors: Martin Spiess, Gerlingen (DE); Markus Blaschka, Schoenaich (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 972 days.

(21) Appl. No.: 15/849,979

(22) Filed: Dec. 21, 2017

(65) Prior Publication Data

US 2018/0111224 A1 Apr. 26, 2018

Related U.S. Application Data

(60) Division of application No. 14/693,515, filed on Apr. 22, 2015, now Pat. No. 10,207,361, which is a
(Continued)

(30) Foreign Application Priority Data

Oct. 22, 2012 (DE) .............................. 102012219196

(51) Int. Cl.
*B23K 26/03* (2006.01)
*B23K 26/36* (2014.01)
(Continued)

(52) U.S. Cl.
CPC ........ *B23K 26/032* (2013.01); *B23K 26/0622* (2015.10); *B23K 26/0876* (2013.01);
(Continued)

(58) Field of Classification Search
CPC ............ B23K 26/0622; B23K 2101/18; B23K 37/0408; B23K 37/0235; B23K 26/36;
(Continued)

(56) References Cited

U.S. PATENT DOCUMENTS

| 4,789,770 A | 12/1988 | Kasner et al. |
| 5,155,328 A | 10/1992 | Ikawa |

(Continued)

FOREIGN PATENT DOCUMENTS

| CN | 1478007 | 2/2004 |
| CN | 101438295 | 5/2009 |

(Continued)

OTHER PUBLICATIONS

International Search Report for corresponding PCT Application No. PCT/EP2013/071897, dated Jun. 12, 2014, 10 pages.
(Continued)

*Primary Examiner* — Dana Ross
*Assistant Examiner* — Kuangyue Chen
(74) *Attorney, Agent, or Firm* — Fish & Richardson P.C.

(57) ABSTRACT

The disclosure relates to methods and systems for piercing, drilling, or cutting metal workpieces in a laser processing operation. The methods include focusing a pulsed laser beam onto a processing location on a workpiece; detecting process radiation emitted from the processing location; determining an intensity of the process radiation at a plurality of temporally sequential times during pulse pauses; determining an intensity gradient of the process radiation; comparing the intensity gradient with a gradient threshold value; and detecting a spontaneous material removal on the workpiece when the number of times the gradient threshold value has been exceeded is above a predetermined limit value. When a spontaneous material removal is detected, the system changes one or both of a laser parameter and a
(Continued)

processing parameter of the laser processing operation. The disclosure also relates to processing machines for carrying out the methods.

4 Claims, 3 Drawing Sheets

Related U.S. Application Data continuation of application No. PCT/EP2013/071897, filed on Oct. 18, 2013.

(51) Int. Cl.
- B23K 37/04 (2006.01)
- B23K 37/02 (2006.01)
- B23K 26/0622 (2014.01)
- B23K 26/08 (2014.01)
- B23K 26/382 (2014.01)
- B23K 101/18 (2006.01)

(52) U.S. Cl.
CPC ............ B23K 26/36 (2013.01); B23K 26/382 (2015.10); B23K 37/0235 (2013.01); B23K 37/0408 (2013.01); B23K 2101/18 (2018.08)

(58) Field of Classification Search
CPC . B23K 26/032; B23K 26/0876; B23K 26/382
USPC .................................................. 219/121.71
See application file for complete search history.

(56) References Cited

U.S. PATENT DOCUMENTS

| | | | |
|---|---|---|---|
| 5,373,135 A | 12/1994 | Beyer et al. | |
| 5,463,202 A | 10/1995 | Kurosawa et al. | |
| 7,358,157 B2 | 4/2008 | Gu et al. | |
| 2002/0166848 A1* | 11/2002 | Furujo | B23K 26/0665 219/121.71 |
| 2003/0192865 A1* | 10/2003 | Cole, III | B23K 26/1436 219/121.67 |
| 2004/0102764 A1 | 5/2004 | Balling | |
| 2005/0103763 A1 | 5/2005 | Momose | |
| 2010/0292676 A1 | 11/2010 | Larsen | |
| 2010/0292679 A1 | 11/2010 | Hoff et al. | |
| 2011/0100967 A1* | 5/2011 | Yoo | B23K 26/032 219/121.73 |

FOREIGN PATENT DOCUMENTS

| | | |
|---|---|---|
| DE | 3926859 | 7/1990 |
| DE | 4336136 | 7/1994 |
| DE | 10305876 | 8/2004 |
| DE | 102008047760 | 3/2010 |
| EP | 0470583 | 2/1992 |
| JP | 06091384 | 4/1994 |
| JP | 06246466 | 9/1994 |
| JP | 08010976 | 1/1996 |
| JP | 2003251477 | 9/2003 |
| WO | WO 2010/031378 | 3/2010 |

OTHER PUBLICATIONS

Notification Concerning Transmittal of International Preliminary Report on Patentability and Written Opinion for corresponding PCT Application No. PCT/EP2013/071897, dated May 7, 2015, 23 pages.

Office Action in U.S. Appl. No. 14/693,515, dated Dec. 11, 2017, 26 pages.

* cited by examiner

METHOD AND PROCESSING MACHINE FOR PIERCING, DRILLING OR CUTTING METAL WORKPIECES

CROSS-REFERENCE TO RELATED APPLICATIONS

This application is a continuation of, and claims priority under 35 U.S.C. § 120, to U.S. Ser. No. 14/693,515, filed Apr. 22, 2015, which is a continuation of PCT Application No. PCT/EP2013/071897 filed on Oct. 18, 2013, which claims priority to German Application No. DE 10 2012 219 196, filed on Oct. 22, 2012. The contents of all of these priority applications are incorporated herein by reference in their entireties.

TECHNICAL FIELD

The present invention relates to a method for piercing, drilling or cutting a metal workpiece in a laser processing operation and a processing machine for carrying out the method.

BACKGROUND

During piercing, drilling, and cutting in metal workpiece materials with a laser beam, in particular when the processing operation is supported by oxygen as the process gas, spontaneous, generally undesirable material removal processes may occur. During piercing, the spontaneous material removal may be so intense that unacceptably large quantities of particles are removed. The spontaneous material removal may lead to contamination, damage or even destruction of laser processing machines and the optical elements close to the process and of the processing nozzles.

JP2003251477A describes a laser processing device and a laser processing method for producing a hole to identify an error directly after an incorrect hole has been produced. To this end, a portion of the pulsed processing laser beam is branched off. The pulsed energy or pulsed power of the branched part-beam is integrated and the integrated value is compared with a predetermined acceptable energy level which is required to produce the hole.

JP8010976A describes a method for piercing a workpiece in which the intensity of radiation reflected on the workpiece is detected and compared with a threshold value in order to decide whether the piercing operation is ended.

It is also known from DE3926859A1, DE4336136A1, EP0470583B1, JP06091384A, and JP06246466A to detect the occurrence of spontaneous material removal processes ("blow up") and/or the ending of the piercing operation by measuring the (process) radiation emitted from the workpiece. In these documents, it is proposed to detect the occurrence of an undesirable process state by comparing the continuously detected quantity of light with a previously determined reference or limit value. When the limit value is exceeded, the processing parameters can be changed by controlling the processing machine in order to prevent the spontaneous material removal. When the limit value is significantly exceeded, the processing operation is stopped.

It is desirable to keep the time required for the piercing or drilling of a hole as short as possible to increase the productivity of the laser processing machine. However, this time cannot be shortened at will without significantly reducing the quality of the perforated hole since, in the event of an excessive application of energy, the above-described spontaneous material removal processes can occur.

SUMMARY

The present disclosure provides methods and processing machines that enable the detection and in particular the control of spontaneous material removal processes during piercing, drilling, or cutting of workpieces during a laser processing operation.

In one aspect, the disclosure features methods for piercing, drilling, or cutting metal workpieces in a laser processing operation, the methods including: focusing a pulsed laser beam onto a processing location on a workpiece; detecting process radiation emitted from the processing location; determining a time ($t_{PP,S}$) at which a pulse pause follows a laser pulse of the pulsed laser beam; determining an intensity ($I_{P1}, I_{P2}, I_{P3}, \ldots$) of the process radiation at a plurality of temporally sequential times ($t_{M1}, t_{M2}, t_{M3}, \ldots$) during the pulse pause; determining at several times a gradient ($dI_{P1-P2}/dt$, $dI_{P2-P3}/dt$, ...) of the intensity ($I_P$) of the process radiation between two of the temporally sequential times ($t_{M1}, t_{M2}; t_{M2}, t_{M3}$); comparing the gradient ($dI_{P1-P2}/dt$, $dI_{P2-P3}/dt$, ...) with a gradient threshold value ($dI_{P,S}/dt$); detecting a spontaneous material removal on the workpiece when the number of times the gradient threshold value ($dI_{P,S}/dt$) has been exceeded is above a predetermined limit value; and when a spontaneous material removal is detected, changing one or both of (i) at least one laser parameter ($t_{LP}$, $t_{PP}$) of the pulsed laser beam, and (ii) at least one processing parameter of the laser processing operation.

In certain embodiments, the methods further include continuously determining an intensity ($<I_P>$) of the detected process radiation averaged over a previous duration of the laser processing operation, and wherein detecting a spontaneous material removal comprises comparing the intensity ($I_P$) of the process radiation in the pulse pause with an intensity threshold value ($I_{P,S}$) that is dependent on the averaged intensity ($<I_P>$). In some embodiments, the methods include changing at least one laser parameter ($t_{LP}$, $t_{PP}$) of the pulsed laser beam when a spontaneous material removal is detected. In some embodiments the methods include changing at least once laser parameter by delaying or preventing a renewed impact of the pulsed laser beam on the workpiece when a spontaneous material removal is detected. In certain embodiments, the methods include changing at least one processing parameter of the laser processing operation when a spontaneous material removal is detected.

In other embodiments, when a spontaneous material removal is detected, the methods can include changing one or both of (i) at least one laser parameter ($t_{LP}$, $t_{PP}$) of the pulsed laser beam, and (ii) at least one processing parameter of the laser processing operation only when a tolerance threshold value ($dI_{P,DS}/dt$) of the gradient ($dI_{P1-P2}/dt$, $dI_{P2-P3}/dt$, ...) $dt$, ...) is exceeded.

In another aspect, the disclosure provides methods for piercing, drilling, or cutting metal workpieces in a laser processing operation, the methods including: focusing a pulsed laser beam in a beam direction (Z) onto a processing location on a workpiece; directing a process gas jet that extends in parallel with the laser beam direction (Z) onto the processing location; and detecting process radiation emitted from the processing location, wherein an auxiliary gas jet that extends at an angle ($\alpha$) with respect to the laser beam direction (Z) is directed onto the processing location when a spontaneous material removal is detected using the detected process radiation.

These methods can further include: determining a time ($t_{PP,S}$) at which a pulse pause follows a laser pulse of the pulsed laser beam; determining an intensity ($I_{P1}$, $I_{P2}$, $I_{P3}$, ...) of the process radiation at a plurality of temporally sequential times ($t_{M1}$, $t_{M2}$, $t_{M3}$, ...) during the pulse pause; determining at several times a gradient ($dI_{P1-P2}/dt$, $dI_{P2-P3}/dt$, ...) of the intensity ($I_P$) of the process radiation between two of the temporally sequential times ($t_{M1}$, $t_{M2}$; $t_{M2}$, $t_{M3}$); and comparing the gradient (dIP1-P2/dt, dIP2-P3/dt, ...) with a gradient threshold value (dIP,S/dt), wherein the spontaneous material removal on the workpiece is detected when the number of times the gradient threshold value ($dI_{P,S}/dt$) has been exceeded is above a predetermined limit value.

In some embodiments of the methods described herein, the process gas jet is an oxygen jet and the auxiliary gas jet is an inert gas jet, a nitrogen jet, or an air jet. In some embodiments of the methods described herein the auxiliary gas jet is directed onto the processing location at higher pressure than the process gas jet. In other embodiments, a volume flow of the process gas jet is reduced when the spontaneous material removal is detected.

In yet another aspect, the disclosure provides processing machines for piercing, drilling, or cutting metal workpieces in a laser processing operation. These processing machines include: a laser source for producing a pulsed laser beam; a focusing device for focusing the laser beam onto a processing location on a workpiece; a measuring device for detecting process radiation emitted from the processing location on the workpiece; and an evaluation device connected to the laser source. The evaluation device is configured to: determine a time ($t_{PP,S}$) at which a pulse pause follows a laser pulse of the pulsed laser beam; determine an intensity ($I_{P1}$, $I_{P2}$, $I_{P3}$, ...) of the process radiation at a plurality of temporally sequential times ($t_{M1}$, $t_{M2}$, $t_{M3}$, ...) during the pulse pause; determine at several times a gradient ($dI_{P1-P2}/dt$, $dI_{P2-P3}/dt$, ...) of the intensity ($I_P$) of the process radiation between two of the temporally sequential times ($t_{M1}$, $t_{M2}$; $t_{M2}$, $t_{M3}$); compare the gradient ($dI_{P1-P2}/dt$, $dI_{P2-P3}/dt$, ...) with a gradient threshold value ($dI_{P,S}/dt$); compare a number of occurrences of the gradient threshold value (dIP,S/dt) being exceeded with a predetermined limit value; and detect a spontaneous material removal on the workpiece when the number of times the gradient threshold value ($dI_{P,S}/dt$) has been exceeded is above a predetermined limit value.

In various embodiments, the evaluation devices in the processing machines are further configured to, when a spontaneous material removal is detected, change one or both of (i) at least one laser parameter ($t_{LP}$, $t_{PP}$) of the pulsed laser beam, and (ii) at least one processing parameter of the laser processing operation. In certain embodiments, the evaluation devices can be further configured to continuously determine an intensity ($<I_p>$) of the detected process radiation averaged over the previous duration of the laser processing operation, and to detect the spontaneous material removal by comparing the intensity ($I_p$) of the process radiation in the pulse pause with an intensity threshold value ($I_{P,S}$) that is dependent on the averaged intensity ($<I_p>$).

In some embodiments, the processing machines can further include a control device of the laser source and a machine control unit, and the evaluation device can be connected to one or both of: (i) the control device of the laser source to control at least one laser parameter ($t_{LP}$, $t_{PP}$) of the pulsed laser beam, and (ii) the machine control unit to control processing parameters of the laser process.

In certain embodiments, the evaluation device can be configured, when a spontaneous material removal is detected on the workpiece, to change one or both of: (i) at least one laser parameter ($t_{LP}$, $t_{PP}$) of the pulsed laser beam, and (ii) at least one processing parameter of the laser processing operation, only when a tolerance threshold value ($dI_{P,DS}/dt$) of the gradient ($dI_{P1-P2}/dt$, $dI_{P2-P3}/dt$, ...) is exceeded.

In yet another aspect, this disclosure provides processing machines for piercing, drilling, or cutting metal workpieces in a laser processing operation. These machines include: a laser source for producing a pulsed laser beam; a focusing device for focusing the laser beam in a beam direction (Z) onto a processing location on a workpiece; a processing nozzle for directing a process gas jet that extends parallel with the laser beam direction (Z) onto the processing location on the workpiece; a measuring device for detecting process radiation emitted from the processing location on the workpiece; an auxiliary gas nozzle for directing an auxiliary gas jet that extends at an angle (α) with respect to the laser beam direction (Z) onto the processing location; an evaluation device configured to use the detected process radiation to detect a spontaneous material removal on the workpiece; and a machine control device configured to activate the auxiliary gas nozzle when the evaluation device detects a spontaneous material removal on the workpiece.

In these processing machines, the evaluation devices can be connected to the laser source and can be configured to: determine a time ($t_{PP,S}$) at which a pulse pause follows a laser pulse of the pulsed laser beam; determine an intensity ($I_{P1}$, $I_{P2}$, $I_{P3}$, ...) of the process radiation at a plurality of temporally sequential times ($t_{M1}$, $t_{M2}$, $t_{M3}$, ...) during the pulse pause; determine at several times a gradient ($dI_{P1-P2}/dt$, $dI_{P2-P3}/dt$, ...) of the intensity ($I_P$) of the process radiation between two of the temporally sequential times ($t_{M1}$, $t_{M2}$; $t_{M2}$, $t_{M3}$); compare the gradient ($dI_{P1-P2}/dt$, $dI_{P2-P3}/dt$, ...) with a gradient threshold value ($dI_{P,S}/dt$); compare a number of occurrences of the gradient threshold value (dIP,S/dt) being exceeded with a predetermined limit value; and detect a spontaneous material removal on the workpiece when the number of times the gradient threshold value ($dI_{P,S}/dt$) has been exceeded is above a predetermined limit value.

Other advantages of the invention will be appreciated from the description and the drawings. The features mentioned above and those set out below can also be used individually per se or together in any combination. The embodiments shown and described are not intended to be understood to be a conclusive listing, but rather exemplary characters for describing the invention.

DETAILED DESCRIPTION

A first aspect of the invention relates to a method including the steps of: focusing a pulsed laser beam onto a processing location on a workpiece; detecting process radiation emitted from the processing location, determining a time at which a pulse pause follows a laser pulse of the pulsed laser beam; determining the intensity of the process radiation at a plurality of sequential times during the pulse pause, determining several times a gradient of the intensity of the process radiation between in each case two of the sequential times, comparing the gradient with a gradient threshold value, and detecting a spontaneous material removal on the workpiece when the number of times the gradient threshold value is exceeded is above a limit value.

The intensity of the process radiation, that is emitted from the processing location on the workpiece and whose wavelength is typically in the infrared wavelength range, is detected during the laser processing operation continuously or almost continuously (that is to say, with high scanning rates in the order of magnitude of, for example, approximately 100 microseconds) at sequential measurement times.

The precise start time and end time of the time period in which a pulse pause follows a laser pulse is typically determined using laser parameters of a laser control device, which predetermines the pulse frequency and the pulse/pause ratio of the pulsed laser beam. During the pulse pause, which is the period during which the laser beam does not act on the workpiece, the intensity of the process radiation has a decay behavior by means of which the stability or instability of the laser processing operation can be determined.

If the temporal evolution of the intensity of the process radiation does not follow the intensity of the laser beam, this is an indication that a spontaneous, explosion-like material removal has occurred. If such a spontaneous material removal is detected, it is possible to manipulate the laser operation to stabilize the processing operation. To reduce the piercing time, however, it is also possible to specifically control the laser processing operation so that a spontaneous material removal occurs in a controlled way, as set out in greater detail below.

The gradient of the intensity of the process radiation, during the pulse pause, is a measure of the decay behavior of the process radiation. In a stable or uncritical laser processing operation, the gradient may assume a sufficiently large negative value in the pulse pause. The gradient of the intensity of the process radiation is in this instance is determined almost continuously by calculating the difference of the intensity of the process radiation measured at two immediately sequential scanning times (or measurement times). The measurement times are typically in a (constant) temporal spacing of, for example, 100 µs. When the intensity gradient determined in the manner described above reaches, over a plurality of scanning times, a negative value (gradient threshold value) that is not sufficiently large, a critical material removal is identified. The frequency and consequently the duration of the occurrences of the (negative) threshold value being exceeded is thus the identifier for a critical material removal.

The gradient threshold value (representing the pitch of the gradient) and the predetermined limit value for the number of permitted occurrences of the gradient threshold value being exceeded can be stored in an evaluation unit, by means of which the measured process radiation intensity is evaluated. These data can also be stored at another location or in another device, with which the evaluation unit can communicate. The data can, for example, be determined by means of test measurements, for example, by means of drilling, piercing, or cutting tests on test workpieces with typical laser and process parameters. As a result of the selection of the threshold value and the limit value for the number of the permitted occurrences of the value being exceeded, a target quality of the laser processing operation is ultimately adjusted.

Generally, the detection described above of a spontaneous material removal is carried out for each laser pulse and each subsequent pulse pause of the laser processing operation. Typical pulse frequencies of the pulsed laser beam are in the range between approximately 1 Hz and below cutting frequencies (approximately 5000 Hz). However, it is also possible to deviate below this range (into the so-called "ultra-low Hz" range) or above the range (into the multi-kilohertz or even into the megahertz range). Depending on the speed of the data processing available, it is optionally possible, particularly at high pulse frequencies, for the evaluation to be carried out periodically, for example, for every second or third laser pulse (and the subsequent pulse pause).

Preferably, in a method according to an embodiment of the invention, the intensity of the detected process radiation averaged over the previous duration of the laser processing operation is continuously determined. In order to detect a spontaneous material removal, the intensity of the process radiation in the process pause, in particular at the end of the process pause, is compared with an intensity threshold value that is dependent on the averaged intensity. In addition to the gradient of the process radiation in the pulse pause, the absolute value of the process radiation in the pulse pause is also relevant for the determination of a spontaneous material removal. Therefore, the existence of a spontaneous material removal can also be verified, in addition to the verification with reference to the gradient, by determining whether or not the absolute value of the intensity of the process radiation in the pulse pause falls below the intensity averaged over the entire previous duration of the laser processing operation or an intensity threshold value. Further, the intensity threshold value may be weighted with process-specific factors that depend on the target quality to be achieved.

To determine the averaged intensity (also called the process curve), the intensity of the process radiation detected at the respective scanning times or measurement times from the beginning of the processing operation, for example, from the beginning of the piercing, are added and then divided by the number of the previous measurement times since the beginning of the process. The current averaged intensity can be weighted in a suitable manner and compared with the (current) intensity of the process radiation. The current average intensity is weighted to account for factors that influence the stability of the laser processing operation or the spontaneous material removal, for example, the type of metal. Dependence of the value of the detected process radiation on the maximum power of the laser used is also taken into account. An 8 kW laser produces, for example, more process light than a 5 kW laser.

In an embodiment, when a spontaneous material removal is detected, at least one laser parameter of the pulsed laser beam is changed to stabilize the laser processing operation. Suitable parameters are the pulse duration of the following laser pulse and the duration of the pulse pause that can be reduced or increased to change the irradiated laser power. When these parameters are changed, the pulse/pause ratio, i.e., the quotient of the laser pulse duration and the entire period duration (that is to say, the total of the duration of the laser pulse and pulse pause) is typically reduced.

In this embodiment, when a spontaneous material removal is present, radiation of the pulsed laser beam on the workpiece is delayed or where applicable completely prevented. For example, the pulse pause can be extended until the currently detected intensity of the process radiation falls below the intensity averaged over the previous process sequence. Optionally, the energy supply of the laser can be interrupted to stop the process or individual laser pulses in the pulse sequence can be omitted, i.e., a new laser pulse is produced, for example, only after one or two period durations in which no laser radiation acts on the workpiece.

In this embodiment, a new laser pulse is generated only when the three following conditions are satisfied:

The evaluation of the gradient of the intensity does not indicate an explosion-like material removal.

The detected intensity of the process radiation is below the averaged intensity of the process curve.

The duration of the pulse pause (which is dependent on the desired power/desired frequency of the laser power) has elapsed.

In another embodiment, when a spontaneous material removal is present, at least one processing parameter of the laser processing operation is changed to move the processing operation into a stable state or to alleviate the consequences of the spontaneous material removal, in particular, for components that are adjacent to the processing location, for example, optical elements or processing nozzles. Processing parameters are parameters of the laser processing operation that are not directly involved with the production of the laser beam, for example, the type or the mixture of the process gases used. For example, the quantity of active component, such as oxygen, available to the process can be reduced in order to extract the active component from the process either partially or completely.

Another processing parameter is the process spacing, for example the spacing between the laser processing head used or the optical focusing unit and the surface of the workpiece. By increasing the spacing between the laser processing head and the workpiece, components that are close to the process can be protected from hot particles that are produced during the spontaneous material removal and that are thrown from the processing location in the direction towards the processing head.

In an alternative embodiment, when a spontaneous material removal is detected, at least one laser parameter of the pulsed laser beam and/or at least one processing parameter of the laser processing operation is/are changed only when a gradient threshold value of the intensity of the detected process radiation is exceeded more than a limit value. In this instance, the laser processing operation (by increasing the oxygen supply and/or by increasing the laser power) is selectively controlled in a manner such that a spontaneous, explosive material removal is carried out. The presence of a spontaneous material removal can be detected in the manner described above and be permitted up to a predetermined gradient threshold value or tolerance limit value (quality adjustment).

The gradient threshold value typically corresponds to a predetermined threshold value of the gradient of the process radiation in the pulse pause and the tolerance limit value corresponds to a determined number of occurrences of this tolerance threshold value being exceeded. Only when the tolerance threshold value or the tolerance limit value have been exceeded is the material reaction considered to be excessively critical and an intervention in the process is undertaken in the manner described above in order to stabilize the laser processing operation. The tolerance threshold value and the tolerance limit value can be varied in accordance with the desired quality of the processing operation, in particular quality of the piercing, in order to achieve piercing results that have different speeds and that differ in terms of quality. In this manner, an explosion-supported piercing can be produced in a workpiece with particularly short piercing times. The accelerated piercing was tested with high-grade steel (stainless steel) with comparatively large workpiece thicknesses of between approximately 15 mm of high-grade steel and approximately 50 mm. Of course, this method can also be used for other materials or workpiece thicknesses.

Another aspect of the invention relates to a method for piercing, drilling, or cutting metal workpieces in a laser processing operation, that includes focusing a pulsed laser beam onto a processing location on a workpiece, orientating a process gas jet that extends parallel with the pulsed laser beam direction onto the processing location, and detecting process radiation that is emitted from the processing location, and orienting an auxiliary gas jet that extends at an angle with respect to the pulsed laser beam direction onto the processing location when a spontaneous material removal is detected using the detected process radiation.

In this aspect of the invention, when a spontaneous material removal is detected, the quantity of oxygen at the processing location is reduced by the auxiliary gas jet that is produced by activating an auxiliary gas nozzle, that is to say, a valve which is connected to the auxiliary gas nozzle is controlled and opened in order to direct the auxiliary gas jet onto the processing location. Typically, the auxiliary gas jet has a lower active component (for example, oxygen) proportion than the process gas jet in order to partially or completely remove the active component from the processing operation. As a result of the use of the auxiliary gas jet, it is typically possible to intervene more rapidly in the processing operation than by reducing the oxygen proportion or the mixture relationship of the process gas used to produce the process gas jet.

The detection of the spontaneous material removal using the detected process radiation can be carried out in different manners. For example, a comparison of the detected intensity of the process radiation with a reference or limit value can be carried out, a spontaneous material removal being detected when the reference or limit value is reached or exceeded. When the auxiliary gas jet is acting on the processing location, the process radiation is further detected. If the detected quantity of light falls below the previously determined limit value, the auxiliary gas jet is switched off again. In order to increase the process reliability, it is optionally additionally possible to determine a minimum period of time for the action of the auxiliary gas jet or the auxiliary gas on the process.

In another embodiment, the method further includes determining a time at which a pulse pause follows a laser pulse of the pulsed laser beam, determining the intensity of the process radiation at a plurality of sequential times during the pulse pause, determining the gradient of the intensity of the process radiation between each of the temporally sequential times, and comparing the gradient with a gradient threshold value. The spontaneous material removal on the workpiece is detected when the number of occurrences of the gradient threshold value being exceeded is above a predetermined limit value. If the frequency of the occurrences of the gradient threshold value being exceeded falls below the previously determined limit value, the auxiliary gas jet is switched off again. Optionally, the auxiliary gas jet may be switched off only when a predetermined minimum time period for the action of the auxiliary gas has elapsed.

In another embodiment, the process gas jet is an oxygen jet and the auxiliary gas jet is an inert gas jet, a nitrogen jet, or a (compressed) air jet. The inert gas jet can be an inert gas/oxygen admixture. The nitrogen jet can also be formed by a nitrogen/oxygen admixture, e.g., compressed air.

In an embodiment, the auxiliary gas jet is directed onto the processing location at higher pressure than the process gas jet. In this instance, the displacement of the process gas by the auxiliary gas at the processing location is increased and an effective "extinction" of the iron/oxygen reaction can be carried out. The pressure of the auxiliary gas jet at the outlet opening of the auxiliary gas nozzle is advantageously intended to be more than approximately 0.5 bar over the pressure of the process gas jet at the outlet opening of the processing nozzle. The pressure of the auxiliary gas jet may be constant or optionally be increased in a stepped or continuous manner until the reaction between iron and oxygen is "extinguished."

In another embodiment, when the spontaneous material removal is detected, a volume flow of the process gas jet is reduced, that is to say, the quantity of the process gas which is supplied to the processing location per time unit is reduced in order to increase the speed of the intervention in the processing operation. The reduction and optionally the complete switching-off of the process gas jet is particularly advantageous when the processing operation is highly unstable. In the case of slight instabilities of the processing operation, the process gas or the process gas jet may in contrast remain unchanged so that, after the auxiliary gas has been switched off, the processing operation quickly returns to its original state.

Another aspect of the invention relates to a processing machine for piercing, drilling, or cutting metal workpieces in a laser processing operation that includes a laser source for producing a pulsed laser beam, a focusing device for focusing the laser beam onto a processing location on a workpiece, a measuring device for detecting process radiation that is emitted from the processing location on the workpiece, an evaluation device which communicates with the laser source to determine a time at which a pulse pause follows a laser pulse of the pulsed laser beam. The evaluation device is constructed to determine the intensity of the detected process radiation at a plurality of sequential times during the pulse pause, to determine, several times in succession, the gradient of the intensity of the process radiation between the temporally sequential times, to compare the gradient with a gradient threshold value, to detect the number of occurrences of the gradient threshold value being exceeded and to compare it with a predetermined limit value in order to detect a spontaneous material removal on the workpiece.

The evaluation device typically has a data interface for communication with the laser source, more specifically with a control device of the laser source, to obtain information relating to the current status of the laser (pulse phase/pulse pause or the beginning and end thereof) and in order to intervene in the laser power supply. As described above in conjunction with the method, the decay behavior of the intensity of the process radiation in the pulse pause is used to detect the presence of a spontaneous material removal. A measuring device may use a sensor element, for example, a photodiode or a camera, to detect process radiation in the infrared wavelength range, by means of which the stability of the laser processing operation can be assessed.

In another embodiment, the evaluation device is constructed to continuously determine the intensity of the detected process radiation, and average the intensity over the previous duration of the laser processing operation. To detect the spontaneous material removal, the intensity of the process radiation in the pulse pause is compared with an intensity threshold value which is dependent on the averaged intensity (which may be weighted by weighting factors). If the intensity of the process radiation has not dropped below the predetermined intensity threshold value, the pulse pause can optionally be extended until the intensity threshold value is reached.

In another embodiment, the evaluation device is connected to a control device of the laser source in order to influence at least one laser parameter of the pulsed laser beam and/or to a machine control unit in order to influence processing parameters of the laser process. Communication with the control device or the machine control unit can be carried out via a data interface. Owing to the influence on the laser processing operation, a control or regulation of the processing operation can be carried out.

In another embodiment, the evaluation device is constructed, when a spontaneous material removal is detected on the workpiece, to change at least one laser parameter of the pulsed laser beam and/or at least one processing parameter of the laser processing operation. An active intervention in the control or regulation of the laser processing operation is consequently carried out.

The control or regulation of the laser processing operation may, for example, be verified in or after each pulse pause whether another laser pulse should be produced. Generally, for producing a subsequent laser pulse, three conditions have to be satisfied: 1) The duration of the pulse pause (dependent on the desired power and the desired frequency) must have elapsed, 2) the switching-off threshold has to be reached, that is to say, the absolute value of the intensity of the process radiation has to have fallen below the intensity threshold value of the averaged intensity (below the process curve), and 3) the decay behavior (or, as a measurement for the decay behavior, the gradient) of the intensity of the process radiation has to comply with the expectations for a deterministic or uncritical processing operation for a sufficiently long period of time (e.g., a specific number of successive measurements).

In an alternative embodiment, the evaluation device is configured to, when a spontaneous material removal is detected on the workpiece, change at least one laser parameter of the pulsed laser beam and/or at least one processing parameter of the laser processing operation when the number of times the tolerance threshold value of the gradient has been exceeded is greater than a tolerance limit value. In this instance, a spontaneous material removal is produced in a targeted manner in order to accelerate the processing operation. If the tolerance threshold is exceeded, the power supply to the laser source can be switched off or reduced and/or the process gas supply can be throttled or the composition of the process gas can be changed by adding other gases.

Another aspect of the invention relates to a processing machine for piercing, drilling or cutting metal workpieces in a laser processing operation that includes a laser source for producing a pulsed laser beam, a focusing device for focusing the laser beam onto a processing location on a workpiece, a processing nozzle for orientating a process gas jet which extends parallel with the beam direction of the laser beam onto the processing location on the workpiece, a measuring device for detecting process radiation which is emitted from the processing location on the workpiece, an auxiliary gas nozzle for orientating an auxiliary gas jet that extends at an angle with respect to the beam direction of the laser beam onto the processing location, an evaluation device which is constructed to detect, using the detected process radiation, a spontaneous material removal on the workpiece and a machine control device which is constructed or programmed to activate the auxiliary gas nozzle when the evaluation device detects a spontaneous material removal.

As illustrated above in conjunction with the method, the auxiliary gas nozzle is activated to supply an auxiliary gas to the processing location and to displace the process gas. When an auxiliary gas that has a lower oxygen proportion than the process gas is used, it is possible to prevent reaction between iron and oxygen. The evaluation device can detect the spontaneous material removal, for example, by comparing the intensity of the detected process radiation with a limit or reference value.

In an embodiment, the evaluation device is configured to determine a time at which a pulse pause follows a laser pulse of the pulsed laser beam, and is connected to the laser source. The evaluation device is also configured to determine the intensity of the detected process radiation at a plurality of sequential times during the pulse pause, to determine the gradient of the intensity of the process radiation between temporally sequential times, to compare the gradient with a gradient threshold value and to compare the number of occurrences of the gradient threshold value being exceeded with a predetermined limit value to detect a spontaneous material removal on the workpiece. Depending on the decay behavior of the process radiation in the pulse pause, a statement can be made relating to the instantaneous stability or instability of the laser processing operation.

Figure 1:
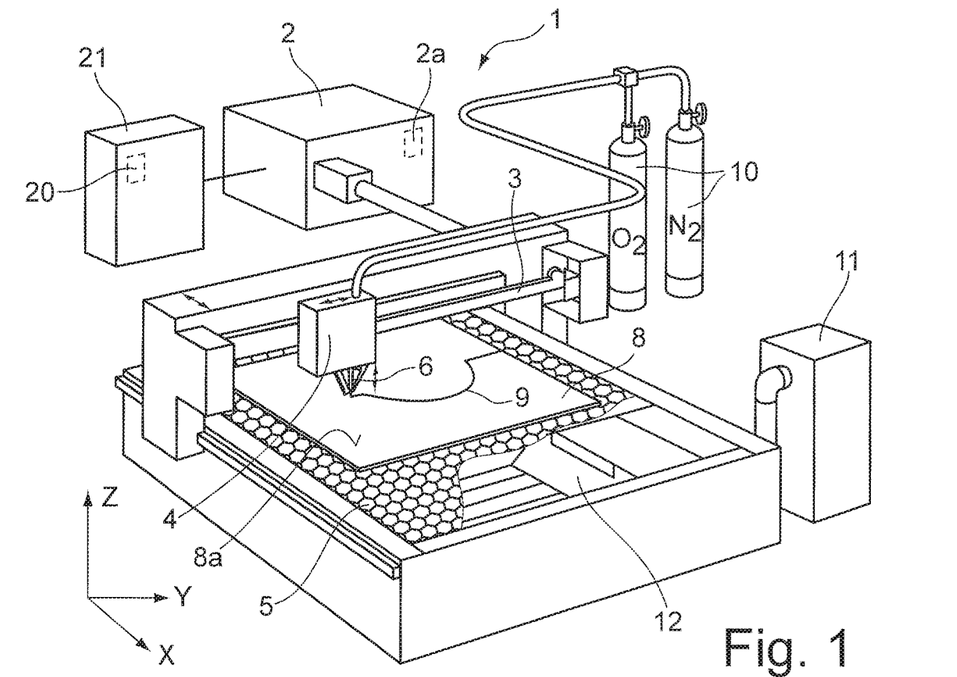
FIG. 1 is a schematic illustration of a laser processing machine.

FIG. 1 shows as an example of a laser cutting machine 1 for laser cutting and/or laser drilling. The laser cutting machine 1 has a $CO_2$ laser source 2, a laser processing head 4 and a workpiece support 5. A laser beam 6, produced by the laser source 2 or by a resonator which is provided in the laser source 2, is guided by means of a beam guidance 3 by redirection mirrors (not shown) to the laser processing head 4. The laser processing head 4 focusses and orients the laser beam 6 using mirrors (not shown) to perpendicularly impinge on the surface 8a of a workpiece 8, that is to say, the beam axis (optical axis) of the laser beam 6 extends perpendicularly on the workpiece 8. Alternatively, the laser cutting machine may have a solid-state laser as a laser source whose radiation is guided to the laser processing head by means of a fiber optic cable.

To laser cut the workpiece 8, a piercing is first carried out with the laser beam 6, that is to say, the workpiece 8 is locally melted or oxidized at one point, and the molten mass that is produced is blown out. Subsequently, the laser beam 6 is moved over the workpiece 8 so that a continuous cutting gap 9 along which the laser beam 6 separates the workpiece 8 is produced.

Both the piercing and the laser cutting can be supported by adding processing/cutting gases 10 which may include one or a combination of oxygen, nitrogen, compressed air and application-specific gases. The choice of processing/cutting gases is ultimately dependent on the material of the workpiece 8 and the quality demands on the workpiece 8. Particles and gases that are produced in the laser cutting machine 1 can be drawn off by a suction chamber 12 using a suction device 11.

The laser cutting machine 1 can include a process light measuring device 13 that can be integrated in the processing head 4 or in the beam path of the laser cutting machine 1.

Figure 2:
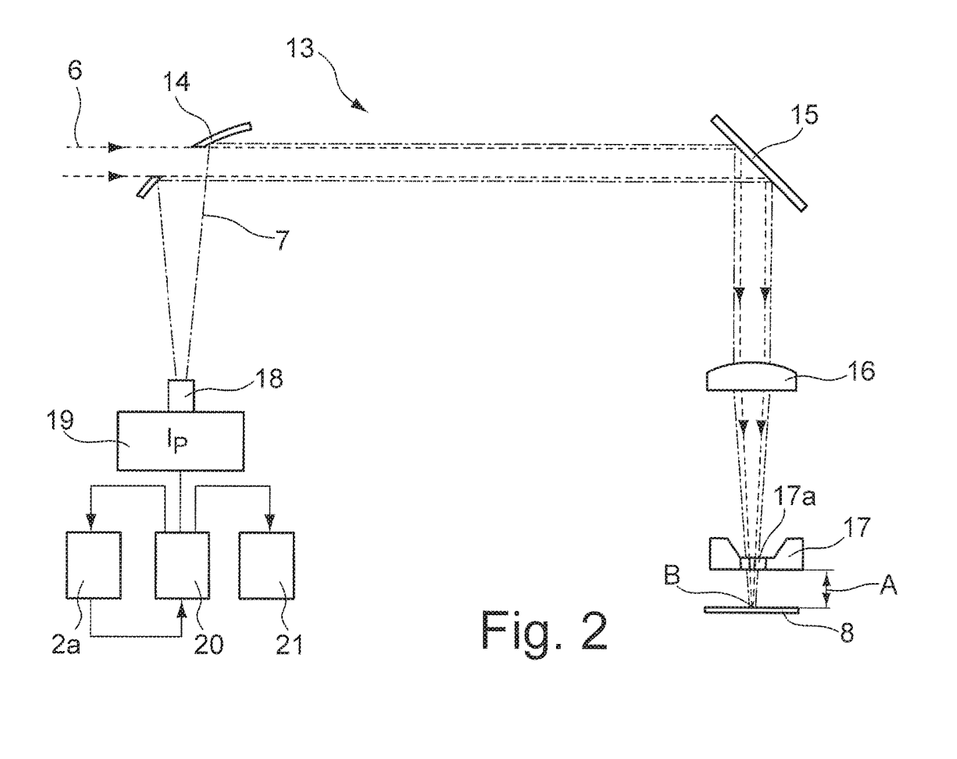
FIG. 2 is a schematic illustration of a process light measuring device of the laser cutting machine of FIG. 1, which is connected to an evaluation device.

FIG. 2 is a simplified illustration of an embodiment of the process light measuring device 13. The process light measuring device 13 includes a scraper mirror 14 which has a hole through which the laser beam 6 passes for the processing operation. The laser beam 6 is redirected by an adaptive mirror 15 through 90°, and then focused by an optical focusing unit 16, which in this instance is constructed as a lens and which may alternatively be constructed as a mirror. The optical focusing unit 16 focuses the laser beam 6 through a nozzle opening 17a of a processing nozzle 17 onto the workpiece 8. The optical focusing unit 16 can include a lens or a mirror. Process radiation 7 in the infrared wavelength range is produced during processing at the processing position B on the workpiece 8. The processing radiation 7 is directed by means of the scraper mirror 14 onto a measuring device in the form of a photo diode 18 which converts the detected beam intensity into a current. An electronic measuring unit 19 measures the current of the photo diode 18, and provides the measured intensity $I_p$ of the process radiation 7 in digital form. The process light measuring device 13 shown in FIG. 2 is typically integrated in the processing head 4 or in the beam path of the laser cutting machine 1. Of course, to redirect the process radiation 7, instead of the scraper mirror 14, other optical elements can be used, for example, a dichroic mirror. For detection of process radiation 7, in place of the photo diode 18, it is possible to use, for example, a camera.

The process light measuring device 13, more specifically the electronic measurement unit 19, communicates with an evaluation device 20. The electronic measuring unit 19 may optionally also be integrated in the evaluation device 20. The evaluation device 20 communicates with a machine control device 21 which controls the piercing operation and performs the additional control tasks for the laser cutting machine 1. As shown in FIG. 1, the evaluation device 20 may also be integrated in the control device 21. The evaluation device 20 also communicates with a laser control device 2a, which is typically integrated in the laser source 2. The evaluation device 20 has suitable data interfaces to facilitate communication between the laser control device 2a and the machine control device 21.

Figure 3A:
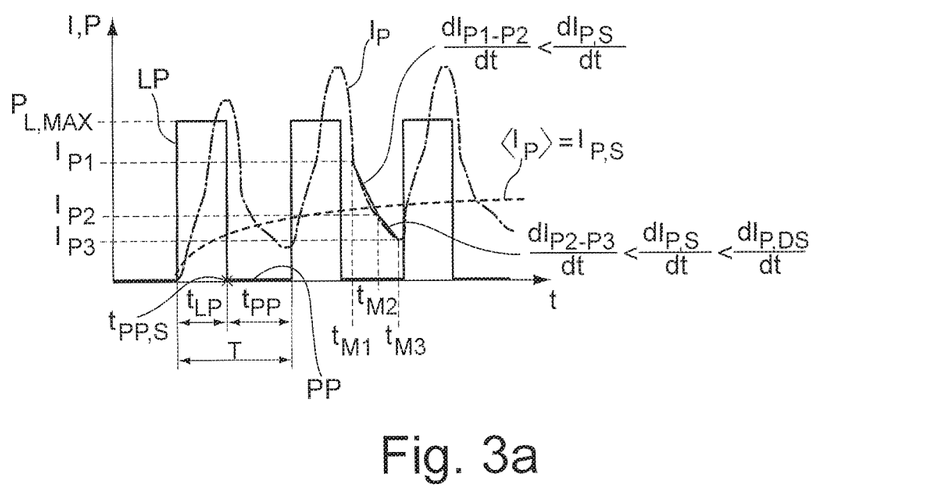
FIGS. 3a and 3b are schematic illustrations of a stable and unstable laser processing operation, respectively.
Figure 3B:
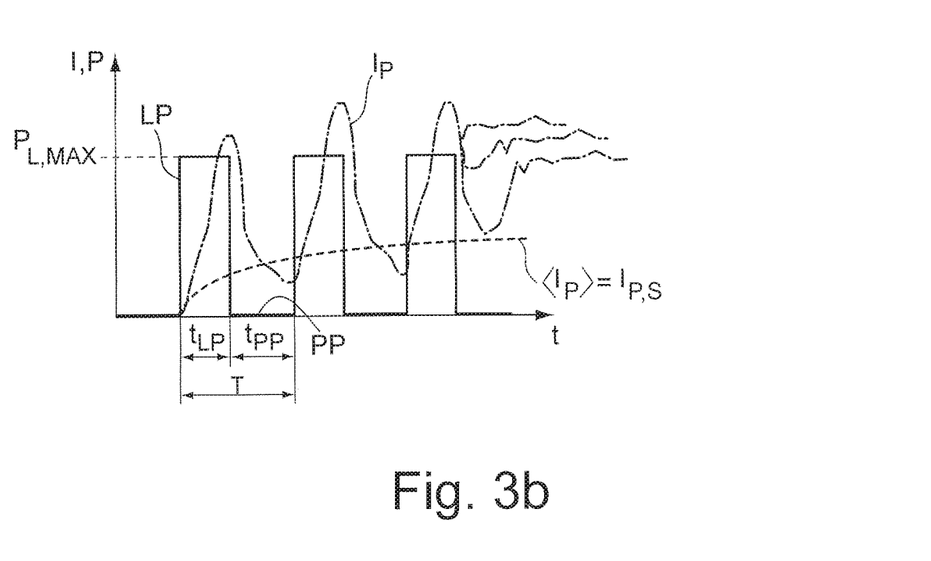

As shown in FIGS. 3a and 3b, the evaluation device 20 determines the temporal behavior of the intensity $I_P$ of the detected process radiation 7 continuously or almost continuously, that is to say, with high scanning rates (measurement rates). For example, the time spacing between the individual measurement times can be 100 microseconds. The laser power $P_L$ is supplied from the laser source 2 in a pulsed manner by a sequence of laser pulses. Consecutive laser pulses are separated by a pulse pause PP. Each laser pulse LP is a square-wave pulse in which the laser power $P_L$ increases, almost instantaneously, from zero to a constant maximum value $P_{L,MAX}$ (for example, several kilowatt) and decreases, almost instantaneously, from $P_{L,MAX}$ to zero. Of course, other pulse forms can also be used to supply the laser power PL.

The duration of the laser pulse LP is $t_{LP}$ and the duration of the pulse pause PP is $t_{PP}$. To determine in which time window or time range $t_{PP}$ of the detected process radiation 7 a pulse pause PP is present and in which time range $t_{LP}$ a laser pulse LP is produced, the evaluation device 20 uses information from the laser control device 2a, in which the time durations of $t_{LP}$ and $t_{PP}$ and the corresponding start times (for example, $t_{PP,S}$ is the start time for the pulse pause PP) and end times are stored. Of course, the information relating to the time window or time durations $t_{PP}$ and $t_{LP}$ can also be determined from the pulse frequency or the period duration T of the pulse sequence and from the pulse/pause ratio $t_{PP}/T$.

The evaluation device 20 can detect a spontaneous material removal from the workpiece 8 by the temporal behavior or decay behavior of the process radiation 7 during the pulse pause PP. To this end, during the pulse pause PP intensities $I_{P1}$, $I_{P2}$, $I_{P3}$ . . . are measured at sequential time $t_{M1}$, $t_{M2}$, $t_{M3}$ . . . respectively. Then the gradient $dI_{P1-P2}/dt$, $dI_{P2-P3}/dt$, . . . of the intensity $I_P$ of the process radiation 7 is determined between two sequential measurement times (for example, between $t_{M1}$ and $t_{M2}$ or $t_{M2}$ and $t_{M3}$) by calculating the difference $I_{P2}$-$I_{P1}$ or $I_{P3}$-$I_{P2}$ respectively of the intensities measured at the respective measurement times $t_{M1}$, $t_{M2}$ or $t_{M2}$, $t_{M3}$. The temporal spacing of the measurement times $t_{M1}$, $t_{M2}$, $t_{M3}$, is constant in this instance. The gradient $dI_{P1-P2}/dt$ and $dI_{P2-P3}/dt$ calculated in this manner is compared with a predetermined gradient threshold value $dI_{P,S}/dt$ of a stable deterministic laser processing operation. It is determined how often (in particular how often in succession) the measured gradients $dI_{P1-P2}/dt$, $dI_{P2-P3}/dt$, exceed the gradient threshold value $dI_{P,S}/dt$ (the gradients are negative). The number of times the gradient threshold value being exceeded, which is related to the duration of the occurrence of the gradient threshold value being exceeded, is compared in the evaluation device 20 with a predetermined limit value (which is a predetermined integer number). If the number of times the gradients exceed the gradient threshold value is greater than the predetermined limit value, this is an indication for spontaneous material removal. In other words, a spontaneous material removal is "detected" when the above condition is met.

During the pulse pause PP, the difference between the currently detected intensity value (for example, $I_{P2}$) of the intensity $I_P$ of the process radiation 7 and the previously detected value (for example, $I_{P1}$) of the intensity $I_P$ is calculated. This difference can be divided by the previously detected value (for example, $(I_{P2}$-$I_{P1})/I_{P1}$) to obtain a relative change of the intensity $I_p$. If the relative change of the intensity $I_p$, in the time range considered (for example, between $t_{M1}$ and $t_{M2}$), is greater than a critical gradient, for example, −3%, a first step of the explosion identification can be activated. If this critical gradient, say −3%, is exceeded several times in succession, that is to say, the intensity reduction is in each case smaller, for example −2%, an explosion or a critical material removal process is deemed to be identified.

For the three shown laser pulses LP of FIG. 3a, the detected process radiation 7 assumes a minimum value before a subsequent laser pulse LP. The minimum value is approximately of the same value, which means that the process shown in FIG. 3a corresponds to the introduced laser power and is consequently substantially deterministic. In the stable laser processing operation shown in FIG. 3a, the gradient $dI_P/dt$ is smaller than the gradient threshold value $dI_{P,S}/dt$, that means a significant decrease of the detected intensity $I_p$. The laser processing operation shown in FIG. 3b moves into a critical state after the third laser pulse LP in which the gradient $dI_p/dt$ assumes during the pulse pause PP a small negative value or even a positive value and is greater than the gradient threshold value $dI_{P,S}/dt$. If the number of occurrences in which the gradient $dI_P/dt$ exceeds the gradient threshold value $dI_{P,S}/dt$ is more than a number stored in the evaluation unit 20, that is to say, is above a limit value, a critical state of the laser process or a spontaneous material removal is detected.

To detect a spontaneous material removal, an average intensity $<I_p>$ of the detected process radiation 7 (process curve) is calculated by averaging the intensity measured over the previous duration of the laser processing operation, by the evaluation device 20. That is to say, the intensity of the process radiation 7 measured at the respective (discrete) measurement times from the start of the first laser pulse LP (for example, at the beginning of the piercing operation), is added together and divided by the number of measurement times. The process curve $<I_p>$ is continuously compared with the measured intensity $I_p$ during the pulse pause PP. If, at the end of the pulse pause PP, the measured intensity $I_p$ is less than the process curve $<I_p>$, the laser processing operation is stable (see, FIG. 3a). The value of the process curve $<I_p>$ at the end of the pulse pause PP consequently represents an additional threshold value $I_{P,S}$ (intensity threshold value) for deciding if the process in a stable state, but is not (taken alone) a sufficient criterion for the process to be stable.

The process curve $<I_p>$, calculated by averaging the intensity of process radiation 7 since the beginning of the process, can optionally also be weighted for comparison with the (current) intensity $I_p$ of the process radiation 7 with a weighting factor F to account for factors that influence the stability of the laser processing operation or the spontaneous material removal. This weighting factor F may also act as a regulation parameter. For example, if the weighting factor F is 0.3, the danger that critical states will arise at all in the process sequence is reduced. In this instance, in contrast to FIGS. 3a and 3b, instead of the averaged value $<I_p>$, a value $F*<I_p>(<I_p>$ weighted with a factor F) is used as an intensity threshold value $I_{P,S}$. It is also possible to weight the averaged intensity $<I_p>$ with a plurality of weighting factors. For example, the weighting factor F can depend on laser power or on a "quality" factor which influences the sensitivity of the regulation/process control.

To stabilize the unstable laser processing operation of FIG. 3b, the evaluation device 20 can control the laser processing operation by influencing at least one laser parameter and/or at least one processing parameter. Suitable laser parameters are the pulse duration $t_{LP}$ of the subsequent laser pulse(s) LP and the duration $t_{PP}$ of the pulse pause PP which can be reduced or increased in order to reduce the effective laser power. For example, the duration $t_{PP}$ of the pulse pause PP can be extended until the average intensity $<I_p>$ falls below the intensity threshold value $I_{P,S}$ and/or the intensity gradient indicates stable laser processing operation. Optionally, the laser source 2 may be switched off or the energy supply may be interrupted in order to stop the processing operation.

Since only switching off the laser power often only very slowly brings about a stabilization of the processing operation, it is additionally possible to carry out an intervention in the processing operation using the machine control device 21. It is, for example, possible to change the type or the mixture of the process gases 10 used. For example, the quantity of oxygen supplied to the process can be reduced in order to remove the active component, for example oxygen, from the processing operation partially or completely.

Figure 4:
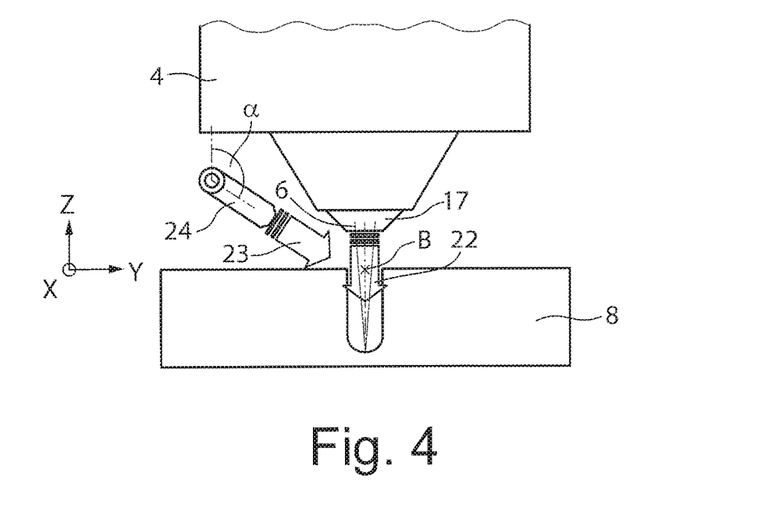
FIG. 4 is a schematic illustration of a processing head of the laser cutting machine with an auxiliary gas nozzle for producing an auxiliary gas jet which extends at an angle with respect to the beam direction.

Alternatively, as shown in FIG. 4, the quantity of oxygen at the processing location B can be reduced by the machine control device 21 that controls a transverse blowing valve of an auxiliary gas nozzle 24 which is fitted to the processing head 4. The auxiliary gas nozzle 24 is configured to direct an auxiliary gas jet 23 which is orientated at an angle α (which is not equal to 0° or 180°) with respect to the beam direction Z of the laser beam 6, onto the processing location B. The angle α in the example is approximately 135°. However, depending on the structural space available at the end of the processing head 4 facing the workpiece 8, α can significantly deviate from this value. The machine control device 21 activates the auxiliary gas nozzle 24 when the evaluation device 20 detects a spontaneous material removal (burn-off).

The auxiliary gas jet 23 has a lower oxygen ratio than a process gas jet 22 which is orientated from the processing nozzle 17 onto the processing location B and which extends parallel or coaxially with the beam direction Z of the focused laser beam 6. The auxiliary gas jet 23 may, for example, include nitrogen, inert gas, a nitrogen/oxygen admixture (for example, compressed air) or an inert gas/oxygen admixture. The process gas jet 22 comprises oxygen or an admixture of oxygen with a higher oxygen ratio than the auxiliary gas jet 23.

If the auxiliary gas jet 23 is directed onto the processing location B at a higher pressure than the process gas jet 22, the process gas is displaced by the auxiliary gas and the iron/oxygen reaction is effectively "extinguished." Using the arrangement shown in FIG. 4, it is possible to intervene more rapidly in the process than by changing the process gas or the composition of the process gas admixture. The pressure of the auxiliary gas jet 23 may be constant or can be increased step-wise or continuously.

If the previously detected instability of the process is not high, the composition of the process gas remains unchanged so that, after the auxiliary gas jet 23 has been switched off, the processing operation rapidly returns to its initial state. In the event of significant instability—the number of times the gradient $dI_P/dt$ exceeds the gradient threshold value $dI_{P,S}/dt$ is greater than the predetermined limit value—the volume flow of the process gas jet 22 can be reduced or the process gas jet 22 can be switched off to increase the rapidity of the intervention.

During the action of the auxiliary gas jet 23, the process radiation 7 continues to be detected and the evaluation device 20 determines temporally sequential gradients $dI_{P1-P2}/dt$, $dI_{P2-P3}/dt$, ... of the intensity $I_p$ of the process radiation 7. If the frequency of the occurrences in which the gradient $dI_P/dt$ exceeds the gradient threshold value $dI_{P,S}/dt$ falls below a previously determined limit value, the auxiliary gas jet 23 is switched off.

To increase the process reliability, it is additionally possible to store in the machine control device 21 a minimum time period for the action of the auxiliary gas jet 23 on the processing location B. The auxiliary gas jet 23 is, in this instance switched off by the machine control device 21 at the earliest when the minimum time period has elapsed, even if the limit value has been underrun before the minimum time period has elapsed.

Using the machine control 21, the effect of the spontaneous material removal on components, such as the focusing lens 16 or the nozzle 17, that are adjacent to the processing location B, can also be reduced. To this end, the operational spacing A between the processing head 4 or the nozzle 17 and the workpiece 8 can be increased so that hot particles which are thrown from the processing location B towards the processing head 4 do not have a sufficient range to reach these components.

The process light measuring device 13, in combination with the evaluation device 20, can also be used to control or manage a piercing operation which, by means of considerable, but limited and controlled energy input into the workpiece 8, minimizes the time that is required for the piercing or drilling of a hole, without excessively reducing the quality of the piercing. During the piercing or drilling process, by means of targeted, high-energy laser pulses in combination with an active process gas (such as, for example, oxygen), very rapid, spontaneous material removals in the workpiece 8 are brought about, as shown in FIG. 5.

Figure 5:
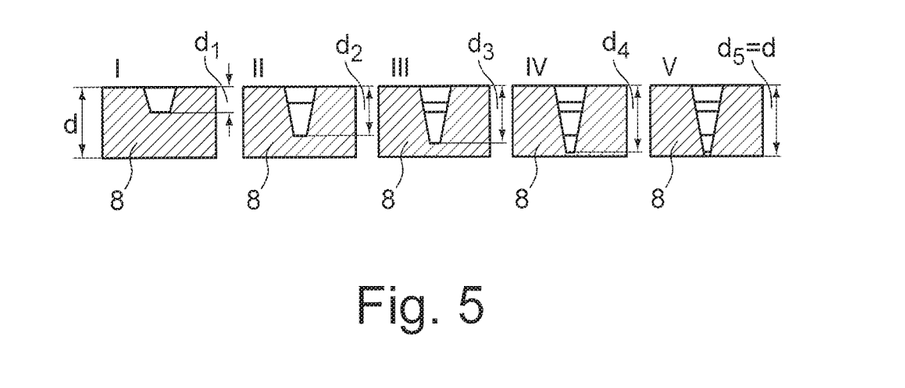
FIG. 5 is a schematic illustration of a plurality of processing steps of a piercing operation.

FIG. 5 shows the process of piercing or drilling a hole in the workpiece 8 in five sequential processing steps I to V. In processing step I, material is removed from workpiece 8 by a controlled energy input at the processing location B resulting in a piercing depth $d_1$. The piercing depth $d_1$ can, for example, be approximately 20% of the entire thickness d of the workpiece 8. In second to fourth processing steps (steps II to IV), the piercing depth gradually increases from $d_2$ to $d_5$. In the fifth processing step V, the piercing depth $d_5$ corresponds to the workpiece 8 thickness d and the end of the piercing operation is reached, that is to say, a piercing or a hole is drilled in the workpiece 8. Properties of the workpiece 8 and the intensity of the laser power used, determines the number of processing steps that are required for the piercing operation.

The material removal or the partial removal of the workpiece 8 in the respective processing steps I to V is carried out in an explosive manner, that is to say, a plurality of explosions are brought about in a controlled manner one after the other. To minimize the time for the piercing operation, the processing steps I to V or the "explosion-assisted" partial removals are carried out rapidly one after the other, i.e., the pulse frequency is generally between approximately 1 Hz and 5000 Hz. The momentum of the piercing operation that is produced in this way leads to a spontaneous material removal that can be detected as described above.

The laser processing operation is in this instance specifically controlled or regulated in such a manner that a spontaneous material removal is carried out, that is to say, in such a manner that the case illustrated in FIG. 3b occurs. An intervention is carried out in the laser processing operation only if, during the pulse pause PP, the threshold value $dI_{P,S}/dt$ exceeds a tolerance threshold value $dI_{P,DS}/dt$ once or several times. This can happen if the material reaction becomes unstable or if the quality of the piercing hole no longer corresponds to the desired quality. The tolerance threshold value $dI_{P,DS}/dt$ depends on the desired quality of the processing of the piercing, and the speed at which the piercing is made.

In addition, to determine whether an intervention has to be carried out in the laser processing operation, it can also be determined that the tolerance threshold value $dI_{P,DS}/dt$ has to be exceeded at a specific number of times, that is to say that the number of occurrences at which the threshold value is exceeded must be above a tolerance limit value. Furthermore, in order to assess the process, it may also be verified whether the instantaneous radiation intensity Ip at the end of the pulse pause PP is below the averaged intensity $<I_p>$ of the process radiation 7. The averaged intensity $<I_p>$ may be calculated using a tolerance factor which increases the response threshold for intervention.

Using the process light measuring device 13 or using the evaluation device 20 and a control or regulation algorithm based thereon, the piercing operation described in conjunction with FIG. 5 can be controlled. In other words, an "explosion-assisted" non-deterministic laser processing operation for the piercing can be used in a controlled manner.

Of course, the method described above can not only advantageously be used in the explosion-supported piercing or drilling operation described in connection with FIG. 5 but also in other operations in which a pulsed laser processing operation is carried out, for example, during a laser cutting operation which follows the piercing or in all critical heating processes, in particular when oxygen is used as a process gas.

The method described can also contribute significantly to the process reliability, especially when thick workpieces 8 are processed. If the processing operation is regulated or controlled in an appropriate manner, both the workpiece material which is intended to be processed and the machine components which are subjected to the laser radiation in the event of a spontaneous material removal are contaminated or damaged to a substantially lesser extent.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method for piercing, drilling, or cutting metal workpieces in a laser processing operation, the method comprising:

focusing a pulsed laser beam in a beam direction (Z) onto a processing location on a workpiece;

directing a process gas jet that extends in parallel with the laser beam direction (Z) onto the processing location;

detecting process radiation emitted from the processing location, wherein an auxiliary gas jet that extends at an angle ($\alpha$) with respect to the laser beam direction (Z) is directed onto the processing location when a spontaneous material removal is detected using detected process radiation emitted from the processing location;

determining a time ($t_{PP,S}$) at which a pulse pause follows a laser pulse of the pulsed laser beam;

determining an intensity ($I_{P1}, I_{P2}, I_{P3}, \ldots$) of the process radiation at a plurality of temporally sequential times ($t_{M1}, t_{M2}, t_{M3}, \ldots$) during the pulse pause;

determining at several times a gradient ($dIp1\text{-}P2/dt, dI_{P2\text{-}P3}/dt, \ldots$) of the intensity (Ip) of the process radiation between two of the temporally sequential times ($t_{M1}, t_{M2}; t_{M2}, t_{M3}$); and comparing the gradient ($dIP1\text{-}P2/dt, dIP2\text{-}P3/dt, \ldots$) with a gradient threshold value ($dIP,S/dt$), wherein the spontaneous material removal on the workpiece is detected when the number of times the gradient threshold value ($dI_{P,S}/dt$) has been exceeded is above a predetermined limit value.

2. The method according to claim 1, wherein the process gas jet is an oxygen jet and the auxiliary gas jet is an inert gas jet, a nitrogen jet, or an air jet.

3. The method according to claim 1, wherein the auxiliary gas jet is directed onto the processing location at higher pressure than the process gas jet.

4. The method according to claim 1, wherein a volume flow of the process gas jet is reduced when the spontaneous material removal is detected.

* * * * *